ns Patent [19]

United States Patent [19]

Mills

[11] 3,865,925
[45] Feb. 11, 1975

[54] PRODUCTION OF CARBON BLACK OF REDUCED GRIT CONTENT

[75] Inventor: King L. Mills, Bartlesville, Okla.

[73] Assignee: Phillips Petroleum Company, Bartlesville, Okla.

[22] Filed: Nov. 3, 1972

[21] Appl. No.: 303,329

[52] U.S. Cl................ 423/450, 423/456, 423/461
[51] Int. Cl.............................................. C09c 1/50
[58] Field of Search ........... 423/450, 455, 456, 457, 423/458, 461

[56] References Cited
UNITED STATES PATENTS

| | | | |
|---|---|---|---|
| 2,564,700 | 8/1951 | Krejci | 423/456 |
| 2,769,692 | 11/1956 | Heller | 423/457 |
| 3,060,003 | 10/1962 | Williams | 423/457 |
| 3,071,443 | 1/1963 | Bellew | 423/456 |
| 3,079,236 | 2/1963 | Heller et al. | 423/456 |
| 3,490,869 | 1/1970 | Heller | 423/455 |
| 3,615,208 | 10/1971 | Byron | 423/450 |

*Primary Examiner*—Edward J. Meros
*Assistant Examiner*—Gary P. Straub

[57] ABSTRACT

A method of reducing carbon black grit content involving two sets of operating conditions in which the feed introduction nozzle is positioned at a first locus until the grit content of the black becomes high, after which the nozzle is relocated and at least one other operating condition altered to produce a lower grit-content carbon black of the original quality.

3 Claims, No Drawings

PRODUCTION OF CARBON BLACK OF REDUCED GRIT CONTENT

This invention pertains to the production of carbon black containing reduced amounts of grit.

In one of its more specific aspects, this invention relates to the production of carbon black under a first set of conditions until the grit content approaches an undesirable level and then altering the conditions of production to produce a carbon black comparable to that produced at the first condition but containing a lower quantity of grit.

Alteration of the operating conditions under which carbon black is produced is well known in the art from such U.S. Pat. Nos. as 3,009,784 and 3,071,443. Such patents indicate that, in addition to such factors as air to hydrocarbon feed ratios, air to fuel gas ratios, hydrocarbon feed rates, temperatures and pressure which can be altered to effect carbon black properties, altering the point of introduction of the hydrocarbon feed into the reactor also has an effect on the properties of the carbon black produced.

For example, in general, increasing the air and gas rate to a carbon black reactor increases the surface area of the carbon black product and to some degree decreases its structure; increasing the hydrocarbon feed rate decreases the surface area of the black. Also, increasing the pressure at which the carbon black is produced tends to decrease the surface area and increase the structure of the black. Increasing the potassium salt addition to the reactor decreases the structure; addition of axial oxygen increases the structure; increasing the oil spray angle increases structure; increasing tangential air temperature increases structure; and decreasing aromaticity of the oil decreases structure, etc. Most of the other parameters of operation similarly affect the quality of the black including altering the point of introduction of the hydrocarbon feed into the reactor, which point when positioned further downstream in the reactor has the effect or increasing the surface area of the black, and, to some degree, decreasing the structure.

It has now been discovered that the grit content of the carbon black product at any one hydrocarbon feed nozzle positioning is relatively low during the initial production and tends to increase as production with the feed nozzle at that location is continued. It has also been determined that the amount of grit contained in the carbon black is, to some extent, proportionate to the amount of carbon-buildup which accumulates on the wall of the reactor proximate the discharge from the nozzle.

The method of this invention is directed towards the solution of the problem involving the grit content in the carbon black and the carbonaceous accumulation on the walls of the reactor.

According to the method of this invention a carbon black reactor is operated under a first set of operating conditions including a first locus of hydrocarbon feed introduction to produce a carbon black product and to deposit carbonaceous materials on the wall of the reactor until the grit content of the carbon black product reaches a maximum allowable level. The operating conditions including the locus of hydrocarbon feed introduction are then altered to a second set of operating conditions to produce a carbon black product comparable in characteristics to that produced under the first set of conditions but containing a decreased quantity of grit and to burn from the walls of the reactor those carbonaceous materials deposited thereon during operations at the first set of operating conditions.

The method of the present invention can be carried out in any furnace which is refractory lined, the refractory contributing to the grit content of the carbon black product, under any conditions employed to produce carbon black. Preferably, it will be carried out in a combustion type reactor such as that illustrated in U.S. Pat. No. 2,564,700. It can be carried out employing conventional hydrocarbon feeds, fuels, oxidants. The method of adjusting the point of hydrocarbon feed discharge from the nozzle into the reactor will be such as is conventionally employed in the art and will conveniently employ a packed-joint through which the nozzle can be adjusted either manually or automatically.

Operation in any of the nozzle positions employed can be for any duration. Preferably, it will be for a period or time during which the carbon black produced will contain less grit than that permissible by the product specification under which it is being produced and during which some accumulation of carbon black is deposited on the walls of the reactor.

Relatedly, operations at the second set of conditions can be for the same or for a different duration during which some or all of the carbon accumulation deposited on the reactor wall during the first set of conditions is burned from the reactor wall. Subsequently, operations can be altered to the first set of conditions, or if desired, to a third set of conditions under which carbon black, comparable to that produced during operation at the first set of conditions, is produced.

To offset the effect of the change in locus of discharge of the hydrocarbon feed nozzle, any operating condition or combination or operating conditions can be adjusted. For example, depending upon whether the nozzle is moved upstream or downstream along the longitudinal axis of the reactor, such factors as feed oil rates, air to fuel ratio (air being employed as the oxidant), preheat temperatures of the air and/or hydrocarbon feed, BMCI (aromaticity) characteristics of the hydrocarbon feed, reactor operating temperature, reactor operating pressure, or other operating variables recognized in the art as affecting carbon black quality can be altered to produce under the subsequently employed conditions a carbon black comparable in properties to that produced under the previously employed conditions.

Relatedly, the properties of the carbon black which can be monitored, while discussed herein in terms of structure and surface area, can, instead, be tint strength, iodine number or any other property of the black whether measurable as a property of the black, per se, or a property (e.g., modulus, tensile strength, etc.) of a rubber or other composition into which the black is blended. While of lesser applicability, adjustments also can be made to maintain carbon black yields.

The method of the present invention is illustrated by the following example which also illustrates the best mode for practicing the invention.

EXAMPLE

A series of theoretical runs is made in a conventional carbon black furnace operated under prior art conditions such as generally within the disclosure of U.S. Pat. No. 2,564,700.

In these runs, it is desired to produce ASTM N 339 black complying with the following specifications

| | |
|---|---|
| Nitrogen Surface Area : | 95 to 105 |
| DBP Structure, cc/100 g: | 120 to 130 |
| Grit, Weight Percent : | Less than 0.10 |

| Condition | 1 | 2 | 3 | 3A | 4 | 5 | 5A | 6 | 7 | 8 |
|---|---|---|---|---|---|---|---|---|---|---|
| Nozzle Position, inches from inlet of combustion zone | 0 | 2 | 2 | 2 | 6 | 6 | 6 | 8 | 8 | 0 |
| Hours Operation | 12 | — | 6 | 12 | — | 6 | 12 | — | 6 | — |
| Oil Rate, GPH | 150 | 150 | 156 | 156 | 156 | 197 | 197 | 197 | 210 | 210 |
| Oil Temperature, °F. | 550 | 550 | 550 | 550 | 550 | 550 | 550 | 550 | 550 | 550 |
| Tangential Air, MSCF/H | 150 | 150 | 150 | 150 | 150 | 150 | 150 | 150 | 150 | 150 |
| Air Temperature, °F | 180 | 180 | 180 | 180 | 180 | 180 | 180 | 180 | 180 | 180 |
| Tangential Gas, MSCF/H | 10 | 10 | 10 | 10 | 10 | 10 | 10 | 10 | 10 | 10 |
| Air to Oil, SCF/gal. | 1000 | 1000 | 962 | 962 | 962 | 761 | 761 | 761 | 715 | 715 |
| Carbon Black Product: | | | | | | | | | | |
| Pelleted, DBP cc/100 g | 126 | 125 | 126 | 126 | 127 | 128 | 129 | 128 | 125 | 123 |
| $N_2$ SA, $m^2$/g | 95 | 108 | 104 | 102 | 125 | 101 | 100 | 125 | 96 | 85 |
| Photelometer | 90 | 90 | 90 | 90 | 90 | 90 | 90 | 90 | 90 | 90 |
| Grit, Wt. % | 0.08 | 0.02 | 0.02 | 0.09 | 0.02 | 0.02 | 0.09 | 0.02 | 0.02 | 0.02 |

In these runs, carbon black production is conducted under various conditions. Operations are established under condition 1 until the grit content of the black becomes undesirably high, that is, at the end of 12 hours, the carbon accumulation on the wall of the reactor has become such that the grit content of the product black approaches the upper limit of the specifications, that is, 0.08 weight percent.

Production is then altered, as indicated, to condition 2, making no other change than to alter the position of discharge of the hydrocarbon feed to a point 2 inches from the inlet of the combustion zone.

At this point in the operations, the grit content of the black is reduced to a value of 0.02 weight percent but the nitrogen surface area is off-specification at $N_2SA$ of 108.

Accordingly, the conditions are altered to those of condition 3 where the feed oil rate is increased to effect a decrease in the air to oil ratio. On-specification black is again produced, the adjustment in feed oil rate compensating for the alteration in the locus of discharge of the feed oil.

Operations are thereafter at condition 3A for a period of about 12 hours after which the grit concentration of the black becomes 0.09 weight percent, approaching the upper limit. Operations are then altered to condition 4 by moving the make-oil nozzle to a position 6 inches from the inlet to the combustion zone. The carbon black produced is off-specification in respect to the nitrogen surface area, so a second adjustment is made to condition 5 by adjusting the oil rate and, resultingly, the air to oil ratio. The carbon black produced thereafter under condition 5 is within specification.

Carbon black production is continued under condition 5 for about 12 hours after which the grit content has increased to about 0.09 weight percent as shown under condition 5A. Accordingly, operations are altered to those indicated by condition 6 by moving the nozzle to a position about 8 inches from the inlet of the combustion zone. The carbon black first produced has too high a surface area so operations are altered to condition 7 by again altering the feed oil rate to decrease the air to oil ratio. Under these conditions, the grit content comes within the desired value and the carbon black is within specifications.

After about 12 hours operation under condition 7, the grit content of the black has again reached a value of about 0.09 weight percent. Since, by this time that carbon deposited proximate the nozzle discharge of condition 1 will have been burned from the walls of the reactor, the feed oil nozzle can be altered and operations continued under condition 1 to produce carbon black.

It will be evident that cyclic operation under the above series of operating conditions can be made innumerable times. It will also be evident that parameters, other than oil rate, or the air to oil ratio, can be adjusted, individually or in combination to compensate for adjustments to the position of discharge of the hydrocarbon feed nozzle. It will also be evident that the adjustment of the locus of discharge from the nozzle and the adjustment of the compensating parameter can be made in either order of succession or simultaneously.

It will be evident from the foregoing that various modifications can be made to the method of this invention. Such, however, are considered to be within the scope of the invention.

What is claimed is:

1. In a process for the production of carbon black wherein oil is axially introduced through a nozzle into a precombustion chamber of a carbon black reactor, wherein hot combustion gases resulting from the combustion of hydrocarbon fuel and air are introduced into said precombustion chamber, wherein said oil is pyrolytically decomposed by said hot combustion gases and wherein carbon black is formed during the travel of the materials through a reaction section, the improvement which comprises:
   a. carrying out the carbon black production until a preselected amount of grit is contained in the carbon black;
   b. changing the axial location of said nozzle to lower the grit production below said presleceted value;
   c. adjusting the ratio of the air feed to the oil feed so as to produce carbon black with essentially the same properties as produced during step (a).

2. A process in accordance with claim 1 wherein the ratio of the air feed to the oil feed is lowered simultaneously while the nozzle portion is changed into an axially further downstream direction.

3. A process in accordance with claim 2 wherein the ratio of the air feed to the oil feed is increased simultaneously while the nozzle portion is changed into an axially further upstream position.

* * * * *